United States Patent
Sogge et al.

[11] Patent Number: 5,959,212
[45] Date of Patent: Sep. 28, 1999

[54] CAPACITIVE PRESSURE TRANSDUCER HAVING REDUCED OUTPUT ERROR

[75] Inventors: Dale R. Sogge, Wrentham, Mass.; Mitchell H. Berkson, Providence, R.I.

[73] Assignee: Texas Instruments Incorporated, Dallas, Tex.

[21] Appl. No.: 09/067,162

[22] Filed: Apr. 27, 1998

[51] Int. Cl.⁶ .............................. G01L 9/12; H01G 7/00
[52] U.S. Cl. ........................................ 73/718; 361/283.4
[58] Field of Search ...................... 361/283.4; 73/718 R, 73/715

[56] References Cited

U.S. PATENT DOCUMENTS

| | | |
|---|---|---|
| 4,158,217 | 6/1979 | Bell . |
| 4,207,604 | 6/1980 | Bell . |
| 4,426,673 | 1/1984 | Bell et al. . |
| 4,716,492 | 12/1987 | Charboneau et al. .................. 361/283 |
| 4,875,135 | 10/1989 | Bishop et al. ........................... 361/283 |
| 5,436,795 | 7/1995 | Bishop et al. ........................ 361/283.4 |
| 5,656,780 | 8/1997 | Park ........................................... 73/724 |

*Primary Examiner*—Max Noori
*Assistant Examiner*—Abdullahi Aw-Musse
*Attorney, Agent, or Firm*—Russell E. Baumann; Richard L. Donaldson

[57] ABSTRACT

A fluid pressure sensor (10) having a capacitive pressure transducer (12) having a thin, relatively flexible ceramic diaphragm (14) mounted in closely spaced apart relation to a rigid ceramic substrate (16) by a glass annulus (18) mounted in a housing (46) having a port (46a) for fluid whose pressure is to be sensed to be received on an outer face of the diaphragm. An electronic circuit (50) is mounted in a chamber (38) formed between a connector (36) and an outer face (12b) of the substrate. A source capacitor plate (20) and source trace (20b) are printed on the diaphragm and a detect plate (22) and detect trace (22b) are printed on a substrate with a guard plate (28, 28', 28"; 30, 30") printed on both the diaphragm and substrate completely surrounding the source and detect plates and traces.

6 Claims, 7 Drawing Sheets

CAPACITIVE PRESSURE TRANSDUCER HAVING REDUCED OUTPUT ERROR

FIELD OF THE INVENTION

This invention relates generally to fluid pressure sensors and more particularly to capacitive pressure transducers having reduced output error.

BACKGROUND OF THE INVENTION

A known pressure sensor, as shown in U.S. Pat. No. 4,716,492, comprises a capacitive pressure transducer having a thin, relatively flexible ceramic diaphragm mounted in closely spaced, sealed, overlying relation to a rigid ceramic substrate and having metal coatings deposited on respective opposing surfaces of the diaphragm and substrate to serve as source and detect capacitor plates arranged in predetermined closely spaced relation to each other to form a capacitor. Electrically conductive traces extend out to pins received in bores formed through the substrate located between the capacitor plates and the outer periphery of the diaphragm and substrate which are connected to an electronic conditioning module attached to the transducer. The diaphragm flexes in response to pressure and causes the source and detect plates to move closer together thereby increasing the capacitance between the plates which is measured by the electronic conditioning module. An annular guard ring of electrically conductive material is printed on the substrate around the detect plate and electrically held at the same voltage as the detect plate. Typically, the guard ring has an inner diameter slightly less than the diameter of the circular source plate. This ring serves as a guard to reduce the electrical field intensity between the source and detect plates at the edges of the detect plate. These fringe electric fields are undesirable because they cause a non-linear pressure transducer output. The electronic conditioning module is designed to measure the capacitance between the source and detect plates only and is insensitive to capacitance between the source plate and the guard, between the detect plate and the guard or between either the source plate or the detect plate and the housing of the sensor.

When used with polar or conductive fluids it has been found that the transducer output shifts by up to 1% full scale or more. Since capacitance is dependent upon both the electric field between the capacitor plates and any dielectric material within the electric field, it is believed that the output error is caused by electric fields between the source and detect plates traveling through the diaphragm and into the working fluid so that when the dielectric coefficient of the working fluid changes the transducer capacitance also changes. In view of the fact that the pressure transducers are used to monitor the pressure of many fluids including those which are polar or conductive, such as water, this error is undesirable.

One proposed solution is to place a thin discrete metal shield on the diaphragm connected to the transducer housing through a compliant, electrically conductive material, such as brass wool. The conductive shield covering the diaphragm and connected to the housing would act as a guard for the entire transducer, that is, the electric fields would not pass through the conductive shield and, therefore, could not be affected by material on the opposite side of the shield. However, this approach is unsatisfactory for several reasons including the possibility of pieces of the wool deteriorating and contaminating the fluid, the effect of pressure from the compliant wool on the transducer output, the durability of the metal shield and questions of compatibility with various working fluids, possible hysteresis due to the metal shield and the question of long term durability of the electrical contact between the shield and the housing.

Another proposed solution is the use of a metal shield printed on the surface of the diaphragm using, for example, the same material, e.g., gold, which is used for the electrically conductive capacitor plates and traces. The printed shield would be connected to the housing using a compliant mechanism such as a washer and a wave spring. However, this approach involves the addition of components which add to the cost of the sensor. It would be desirable to provide a sensor in which the output error is minimized or eliminated without appreciably impacting the cost of the sensor.

SUMMARY OF THE INVENTION

It is an object of the present invention to provide a capacitive fluid pressure transducer having an improved error free output when used with polar or conductive fluids free of the above noted limitations. Another object of the invention is the provision of a capacitive pressure transducer having an improved error free output when used with polar or conductive fluids which is economical to manufacture yet reliable and of relatively low cost.

Briefly described, the novel and improved pressure sensor of the invention comprises a capacitive pressure transducer having a rigid ceramic substrate having a face surface and a thin, relatively flexible ceramic diaphragm having a face surface mounted in aligned, spaced apart relation with the face surfaces facing each other. An electrically conductive detect plate is disposed on the face surface of the substrate with an electrically conductive detect trace extending from the plate out to a detect pin receiving aperture disposed between the plate and the outer periphery of the substrate. An electrically conductive guard plate is disposed on the face of the substrate comprising a first portion in the form of a discontinuous annulus surrounding the detect plate and having opposed ends spaced adjacent to and spaced from the detect trace, and a second portion extending radially outwardly from a location adjacent the opposed ends of the annulus portion to a location contiguous to a guard pin aperture and on either side of and spaced from the detect trace and surrounding and spaced from the detect pin aperture. An electrically conductive source plate is disposed on the face surface of the diaphragm with an electrically conductive source trace extending from the source plate to a source pin site disposed between the source plate and the outer periphery of the diaphragm. An electrically conductive diaphragm guard plate is disposed on the face of the diaphragm comprising a first portion in the form of a discontinuous annulus having opposed ends adjacent to and spaced from the source trace around the source plate and spaced therefrom, the diaphragm guard plate having a second portion extending radially outwardly from a location adjacent the opposed ends of the guard plate annulus portion to a location contiguous to a guard pin site and on either side of and spaced from the source pin site. An electrically insulative glass annular ring is used to maintain the diaphragm and the substrate in spaced apart, sealed relation. The glass annular ring is disposed adjacent to the outer peripheries of the diaphragm and substrate and has open portions aligned with the source, guard and detect pin receiving apertures and sites. According to a feature of the invention, the glass annular ring overlaps the ends of the discontinuous detect and source annulus portions to ensure that the conductive materials will not creep toward one another.

DESCRIPTION OF THE PREFERRED EMBODIMENTS

Figure 1:
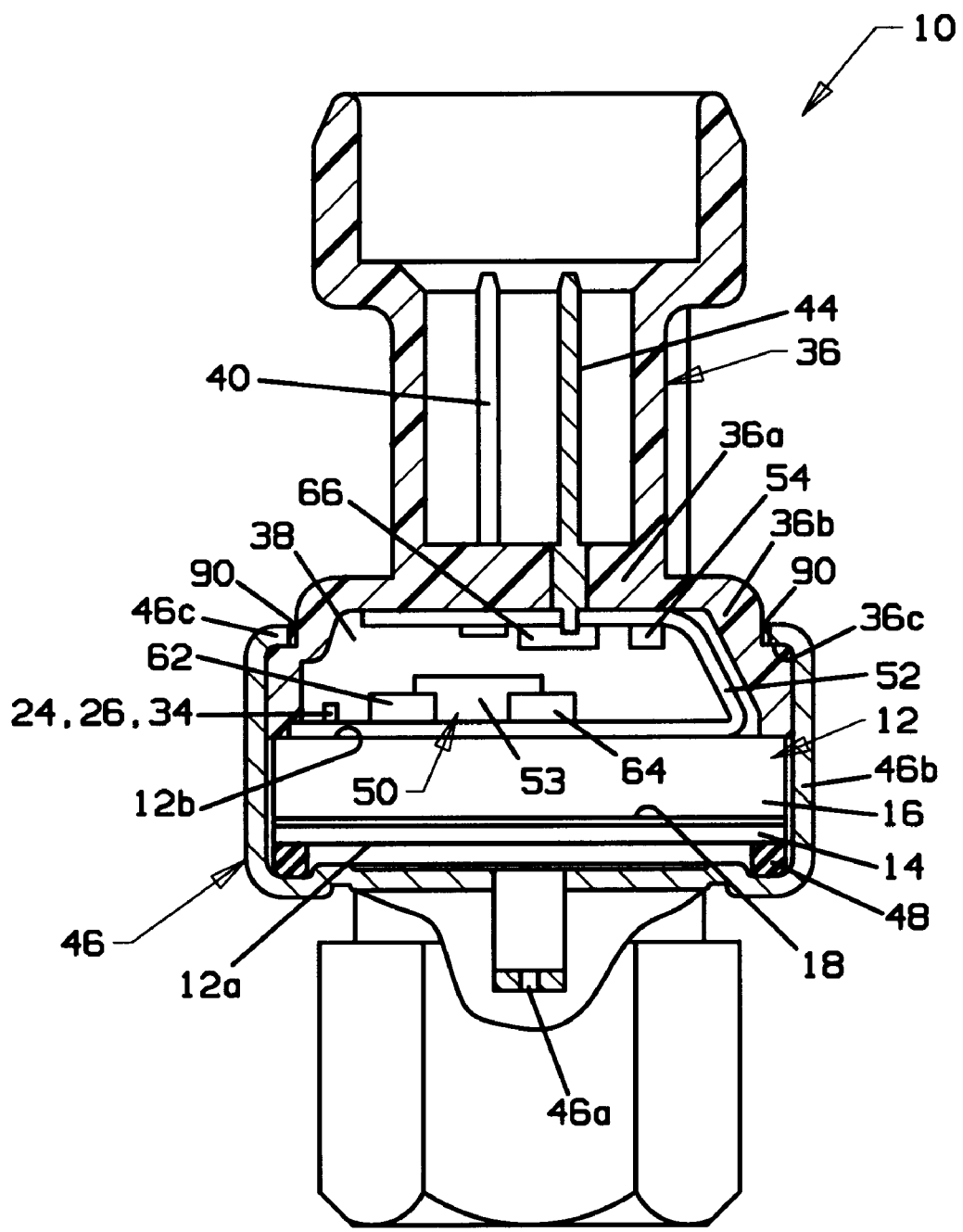
FIG. 1 is an elevational view in cross section of a pressure sensor made in accordance with the invention.

Referring to the drawings, numeral 10 in FIG. 1 indicates the novel pressure sensor of the invention which includes a fluid pressure responsive capacitive transducer 12, preferably of a flat disc shape as shown having one surface 12a to be exposed to an applied fluid pressure and having an opposite surface 12b having transducer pin terminals 24, 26, 34 disposed therein. Preferably the transducer comprises a thin, relatively flexible diaphragm 14 of a ceramic material such as alumina or the like mounted in closely spaced, sealed, overlying relation to a ceramic substrate 16 of a similar material by a glass sealant 18 or the like (see FIG. 4) to be movable relative to the substrate in response to changes in the applied pressure. Metal coatings 20 and 22 (FIGS. 2, 3) are provided on opposing first face surfaces 14a, 16a of the diaphragm and substrate, respectively, to serve as capacitive plates arranged in closely spaced relation to form a capacitor having a capacitance which varies with the applied pressure. Pin terminals 24, 26 extend from the capacitor plates in sealed relation through the ceramic substrate to be disposed on surface 12a of the transducer. A metal source guard ring 28 surrounds capacitor plate 20 on diaphragm 14 and a metal detect guard ring 30 surrounds capacitor plate 22 on substrate 16 with pin terminal 34 extending from guard ring 28, 30 through the substrate in the same manner as pin terminals 24, 26 to be discussed further below.

Sensor 10 further includes a connector body 36 of an electrical insulating material such as a glass reinforced polymer which is disposed in overlying relation to surface 12b of the transducer to form a chamber 38 therebetween. Preferably, the connector body is cup shaped having a bottom 36a, a sidewall 36b and a flange 36c extending around the sidewall, and has a plurality of connector terminals 40, 42, 44 (not shown) extending from the chamber, preferably through the bottom 36a of the connector body to a location exteriorly of the sensor. The connector body is disposed with the free end of the sidewall 36b in facing relation to surface 12b of the transducer for forming chamber 38. A housing 46 has a port 46a for exposing the transducer surface 12a to an applied pressure, a sealing ring 48 or the like disposed between the transducer surface 12a and the port and a metal sleeve 46b receiving the transducer and at least part of the connector therein, the sleeve having a free end portion 46c deformed by swaging or the like over at least a portion of the connector body such as the flange 36c for clamping the connector body and transducer together to form chamber 38. Sealant 90 may be injected in the annular space between the free end portion 46c and the connector body 36 to provide an environmental seal.

Sensor 10 further includes an electric circuit 50 disposed in chamber 38 electrically connected to the transducer and connector terminals for providing an electrical signal corresponding to the pressure applied to the capacitive transducer of the type shown in U.S. Pat. No. 4,875,135. As such an electrical circuit is shown as referenced in the patent, further details of the circuit are not described herein and it will be understood that the circuit includes circuit components such as an integrated circuit 53, resistors 64, 66, capacitors 54, 62 and the like mounted on a substrate 52 or the like.

Figure 3:
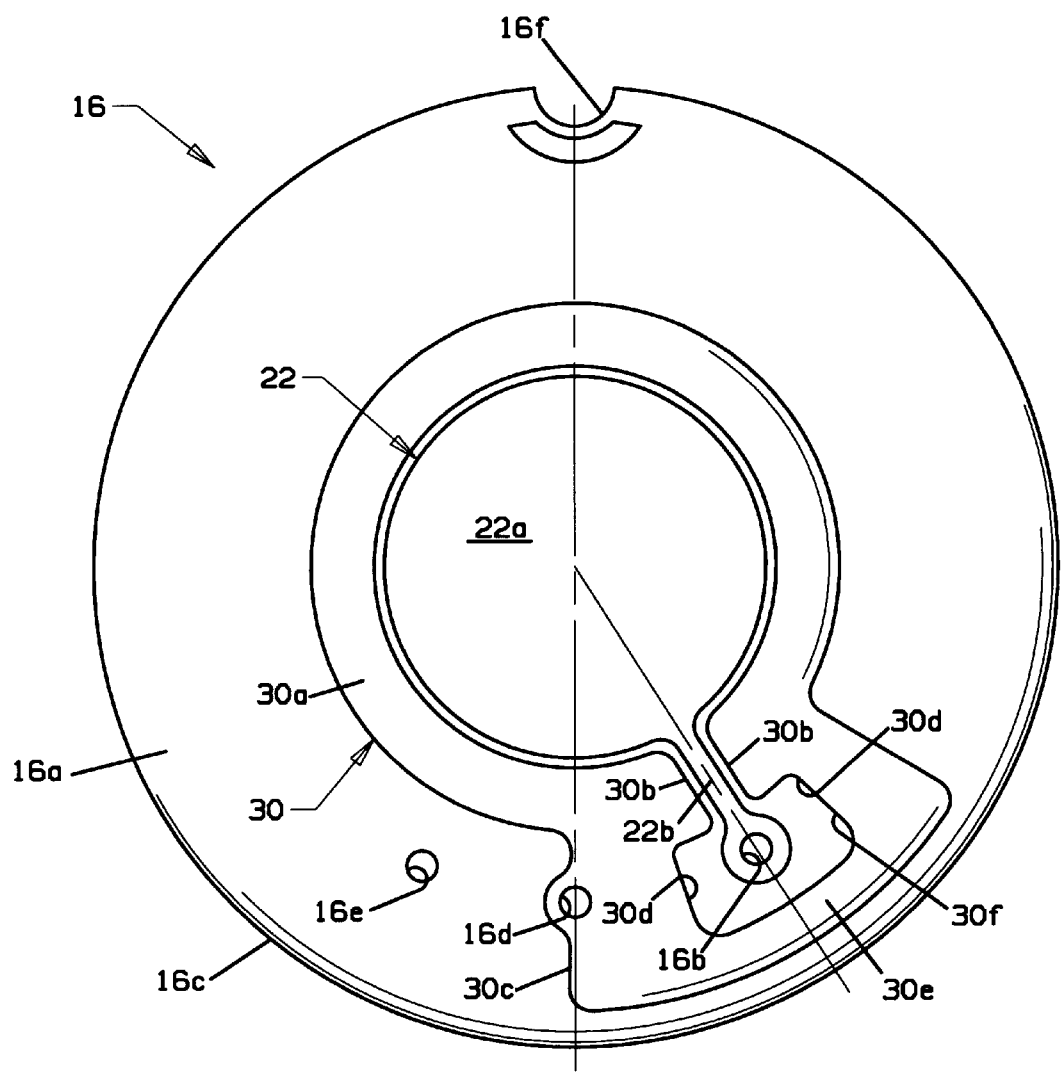
FIG. 3 is a plan view, similar to FIG. 2, of the first or inner face of the substrate of the FIG. 1 capacitive transducer showing the detect plate and detect guard plate configurations of the first embodiment.

As seen in FIG. 3, substrate 16 of transducer 12 has an electrically conductive, generally circular detect plate 22a centrally disposed on a first or inner face surface 16a by any suitable means, as by screen printing, and an electrically conductive trace 22b extending radially outwardly to a detect pin receiving aperture 16b disposed intermediate the detect plate and the outer peripheryl 6c of the generally circular substrate. An electrically conductive detect guard plate 30 is disposed on face surface 16a comprising a first generally discontinuous annulus portion 30a having opposed ends 30b adjacent to and spaced from detect trace 22b. A second detect guard portion 30c extends radially outwardly from a location 30d adjacent each opposed end 30b to a location contiguous to and surrounding guard pin aperture 16d and spaced from the detect pin aperture 16b and joined together at 30e at a location radially beyond pin aperture 16b so that a closed opening 30f is formed extending around the detect trace and pin aperture.

By way of example, devices made in accordance with the invention have a detect plate 22a formed with a radius of 0.150 inch, an annulus guard portion with an inner radius of 0.160 inch and an outer radius of 0.235 inch. Opposed ends 30b are formed with an outer radius of 0.265 inch. Pin apertures 16b, 16d and a source pin aperture 16e are spaced at 25 degrees apart at a radius of 0.300 inch. It will also be noted the substrate 16 is formed with a registration notch 16f.

Figure 2:
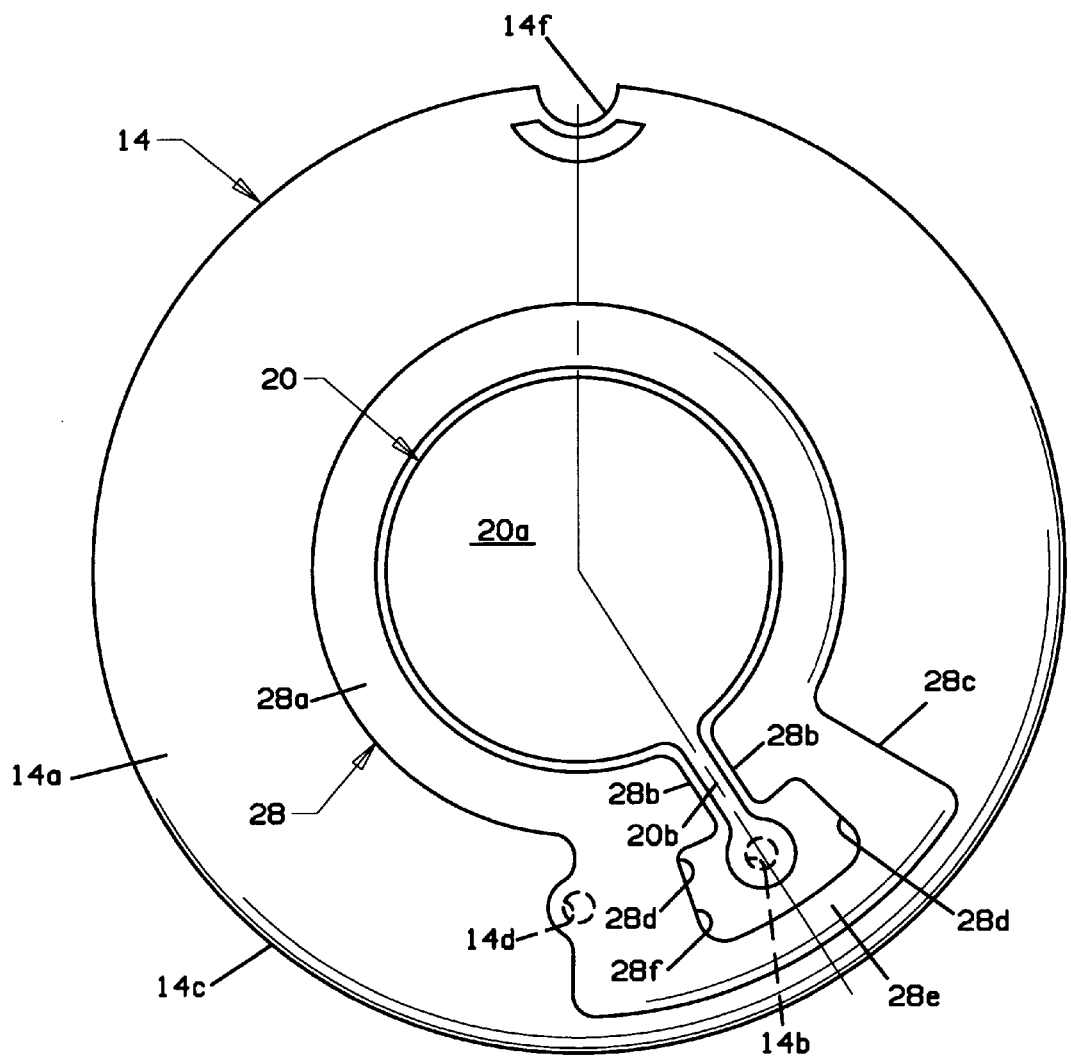
FIG. 2 is a plan view of the first or inner face of the diaphragm of the capacitive transducer of FIG. 1 showing the source plate and source guard plate configurations according to a first embodiment of the invention.

With reference to FIG. 2, diaphragm 14 of the transducer has an electrically conductive, generally circular source plate 20a centrally disposed on a first or inner surface 14a by any suitable means, as by screen printing, and an electrically conductive trace 20b extending radially outwardly to a source pin site 14b disposed intermediate the source plate and the outer periphery 14c of the generally circular diaphragm matching the outer periphery of substrate 16. An electrically conductive source guard plate 28 is disposed on face surface 14a comprising a first generally discontinuous annulus portion 28a having opposed ends 28b adjacent to and spaced from source trace 20b. A second source guard portion 28c extends radially outwardly from a location 28d adjacent each opposed end 28b to a location contiguous to and surrounding ground pin site 14d and spaced from the source pin site 14b and joined together at 28e at a location radially beyond the pin site 14b so that a closed opening 28f is formed extending around the source trace and pin site.

Conventional source plates, where no guard is provided typically have a radius approximately as large as the outer radius of the detect guard annulus. As shown in the present embodiment the radius of source plate 20 is 0.170 inch, intermediate the inner and outer radii of the detect guard annulus and somewhat larger than that of the detect plate described above. The inner and outer radii of the discontinuous annulus portion 28a is 0.180 inch and 0.235 inch, respectively. The outer radius of opposed ends 28b is 0.265, the same as opposed ends 30b of the detect guard. Registration notch 14f is provided in the outer periphery in the same manner as notch 16f of substrate 16.

Figure 4:
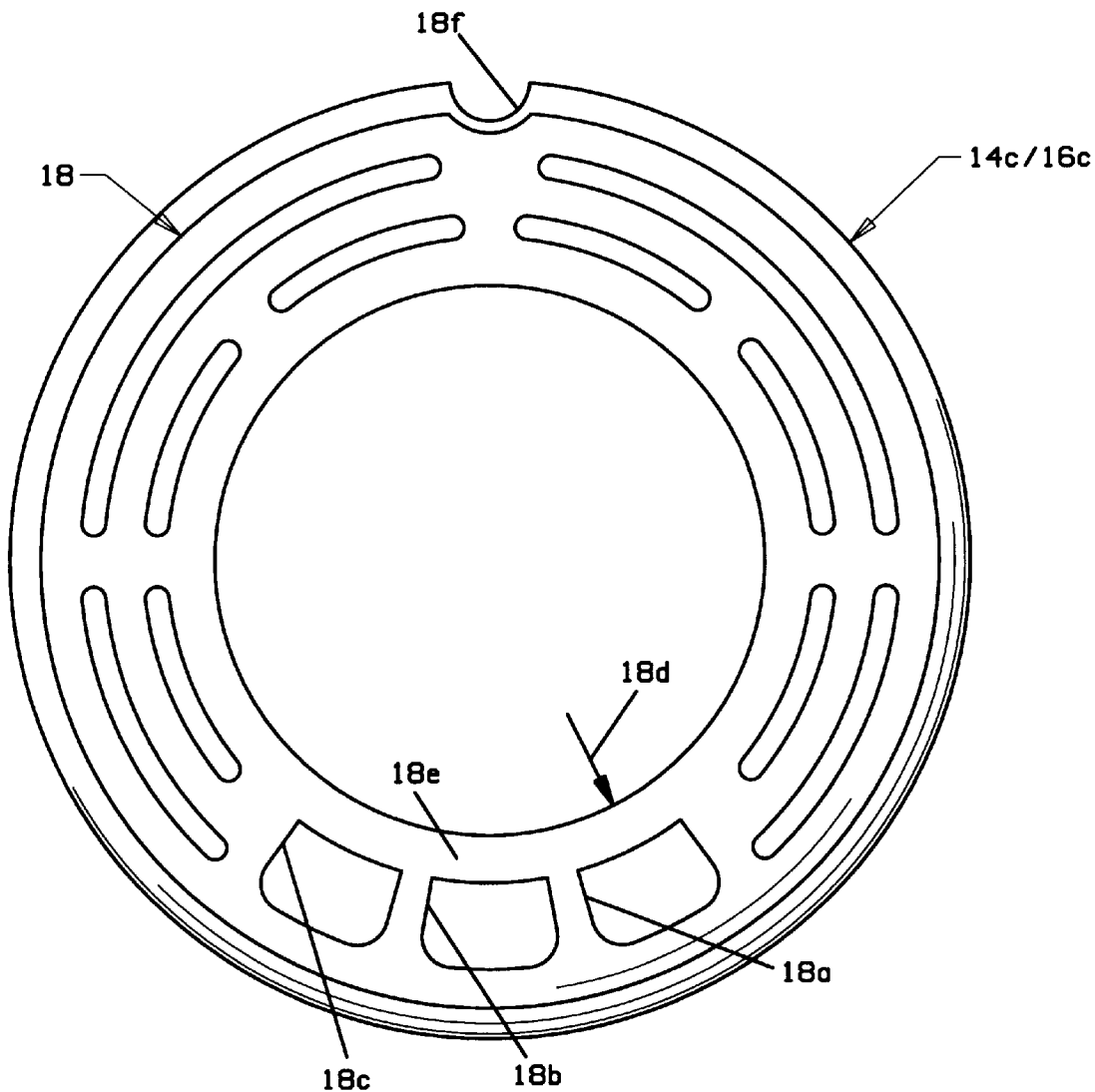
FIG. 4 is a plan view of the glass spacer used in the above embodiment between a substrate and diaphragm of a respective capacitive transducer, also showing the outer periphery of the diaphragm and/or the substrate.

Spacing and sealing glass annulus 18, a generally circular member shown in FIG. 4, is provided with closed openings 18a, 18b, 18c, spaced 25 degrees apart for alignment with pin apertures 16b, 16d, 16e utilizing registration notch 18f.

The provision of a source guard plate surrounding the source plate, source trace and source pin aperture on the first face surface of the diaphragm as well as a detect guard plate surrounding the detect plate, detect trace and detect pin aperture on the first face surface of the substrate essentially eliminates pressure transducer output error due to the presence of polar or conductive fluids.

Figure 5:
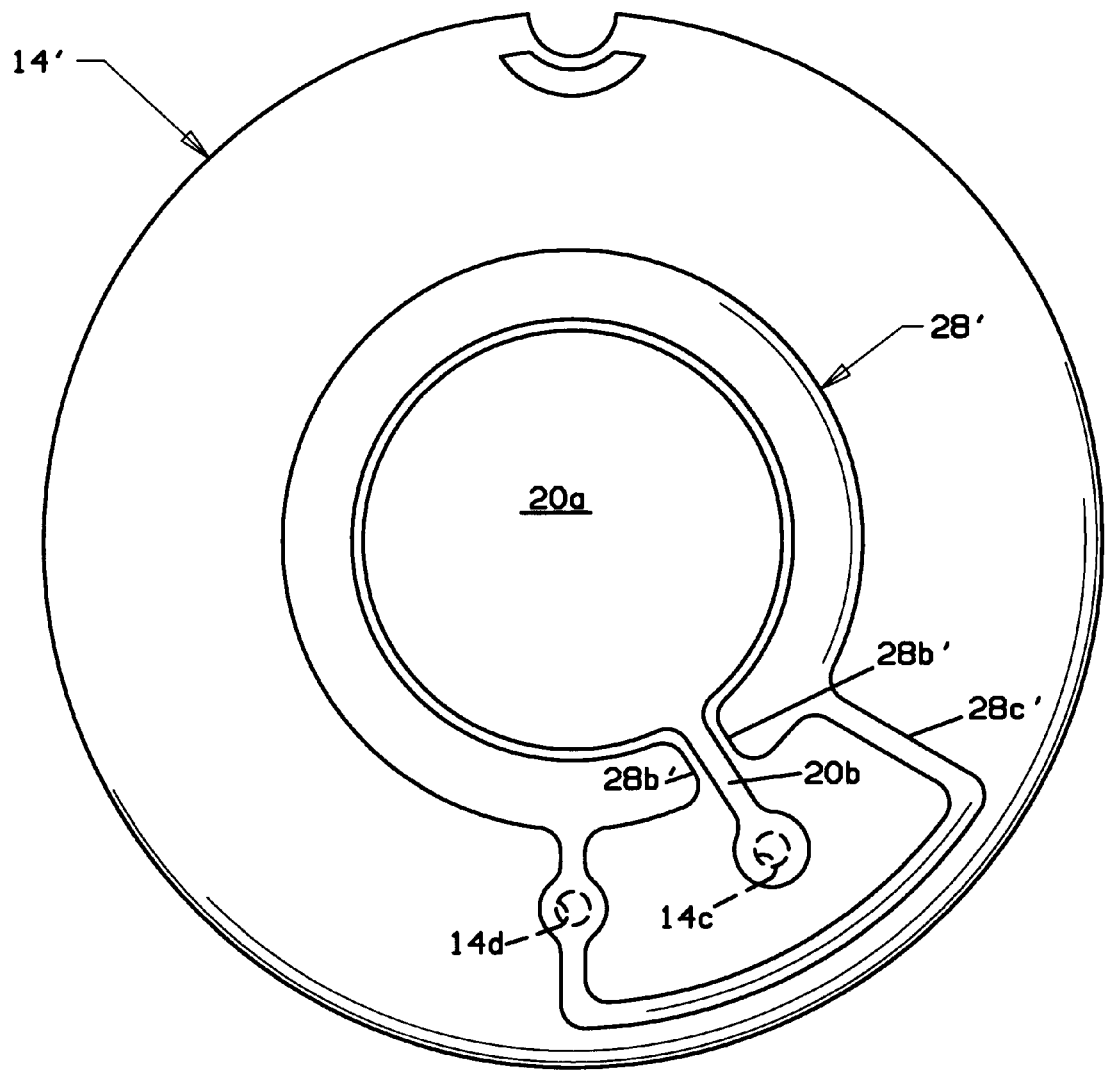
FIG. 5 is a plan view, similar to FIG. 2, of a diaphragm on which a modified source guard plate configuration is depicted.

FIG. 5 shows a diaphragm 14' having a modified source guard 28' in which the outer radius of opposed end portions 28b ' is the same as the remainder of the generally discontinuous annular portion, i.e., 0.235 inch, the radially extending second portion 28c ' is in the form of a trace having essentially the same width as that of trace 20b. The smaller outer radius of opposed ends 28b ' in combination with glass annulus 18 provides glass material extending radially outwardly beyond the opposed ends to ensure that the respective metals layers on the diaphragm and substrate cannot creep up the edge of the glass into contact with one another.

Figure 6:
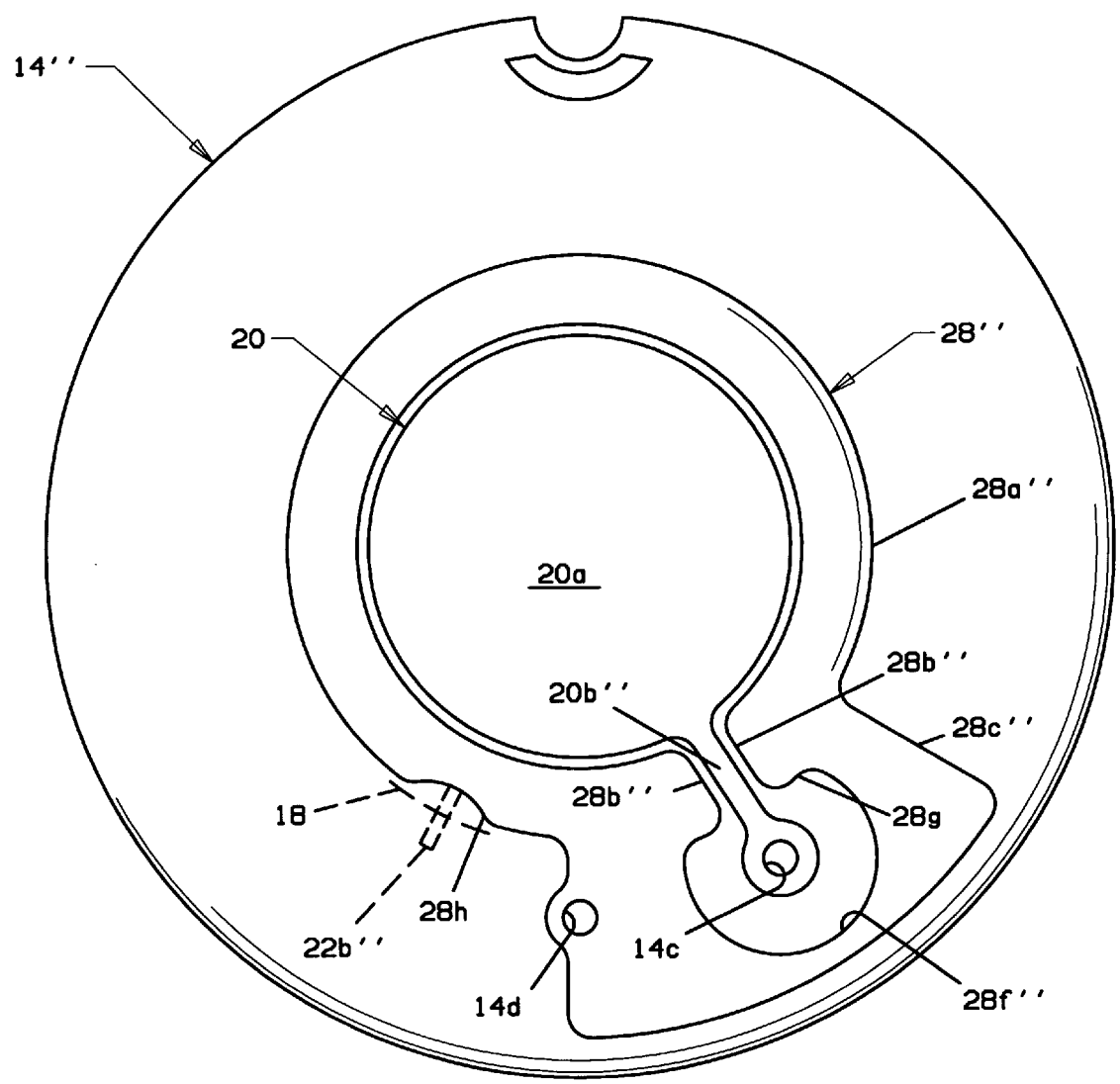
FIG. 6 is a plan view, similar to FIG. 2, of a diaphragm of the capacitive transducer of FIG. 1 showing the source plate and source guard plate configurations according to another embodiment of the invention.
Figure 7:
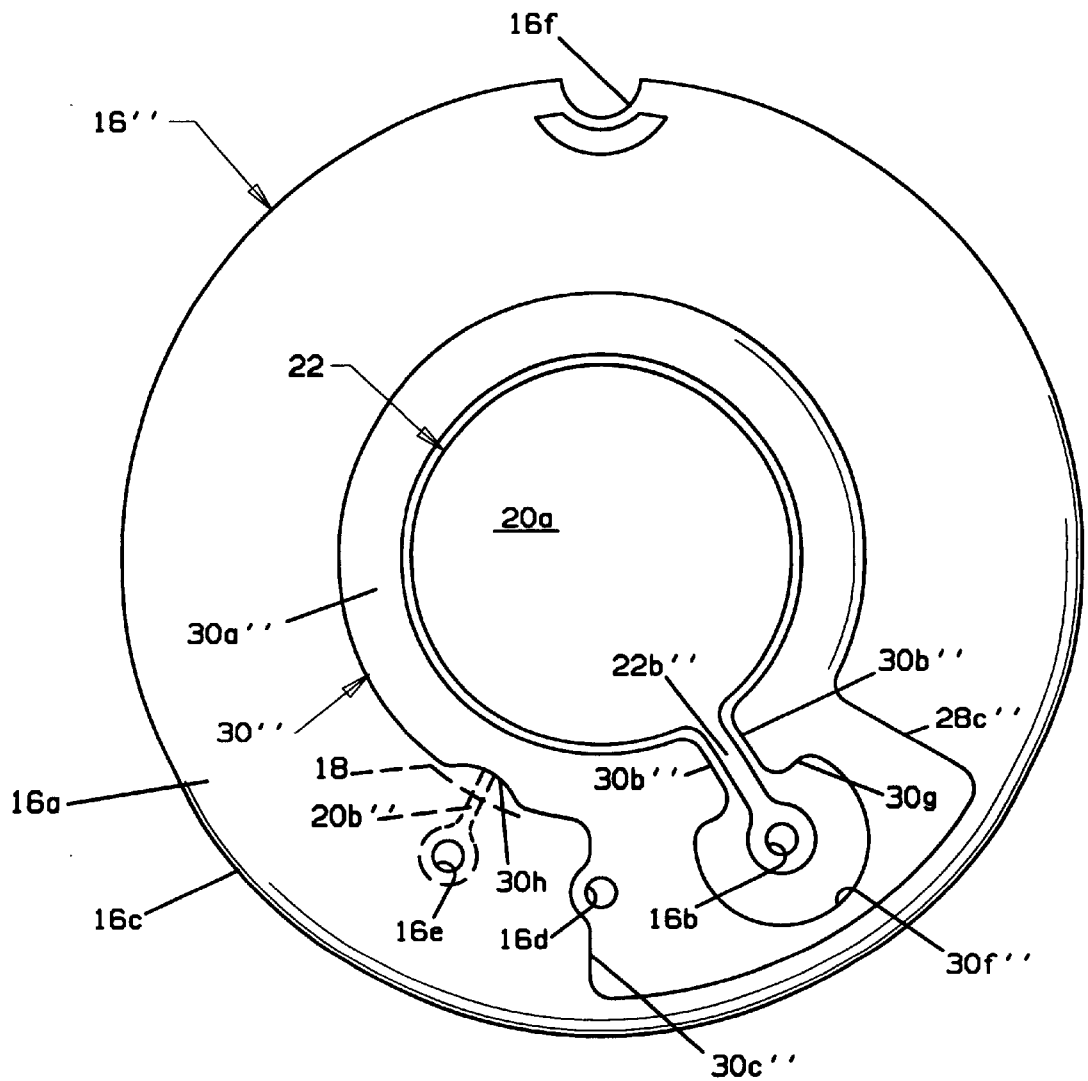
FIG. 7 is a plan view, similar to FIG. 3, of a substrate of the capacitive transducer of FIG. 1 showing the detect plate and detect guard plate configurations used with the diaphragm made according to the FIG. 6 embodiment.

FIGS. 6 and 7 show another modified metallization pattern of both the diaphragm 14" and the substrate 16". Detect trace 22b" and the source trace 20b" are somewhat narrower than in the FIGS. 2, 3 embodiment, e.g., 0.008 inch as opposed to 0.020 inch and second guard portions 30c" and 28c" are formed with a generally circular opening 30f" and 28f" which blend with the outer radii 30g, 28g of opposed ends 30b", 28b" of the discontinuous annulus. Radii 30g, 28g are preferably equal to one another and are selected so that the inside radius 18d of glass annulus 18 is slightly less so that the glass layer 18e overlaps the guard layers preventing any creeping of the electrically conductive material up the edge of the glass layer and possible shorting with the detect and trace layers. First discontinuous annuli 28a", 30a" are each provided with a radiused recessed portion 28h, 30h respectively, in radial alignment with the respective guard pin site 14e and guard pin aperture 16e. This feature provides suitable clearance to prevent possible metal migration over the inner portion of glass annulus 18 from contacting a trace layer. By way of illustration, dashed lines in FIGS. 6 and 7 are shown to indicate the relative positions of the inner boundary of glass annulus 18 and detect trace 22b" (FIG. 6) and source trace 20b" (FIG. 7) in the assembled transducer. Recessed portion 28h of first discontinuous guard annulus 28a" ensures that even if metal from detect trace 22b" migrates across the edge of glass annulus 18 there is sufficient clearance to prevent contact with guard plate 28". The same is true of recessed portion 30h of guard plate 30" relative to source trace 20b". Windows 18a, 18b and 18c are formed in glass annulus 18 for alignment with pin apertures 16b, 16d and 16e, respectively and with a selected clearance, e.g., 0.030 inch as shown, around the overlap between the detect and source traces and the edge of the glass annulus.

It should be understood that although particular embodiments of the invention have been described by way of illustrating the invention, the invention includes all modifications and equivalents thereof falling within the scope of the appended claims.

We claim:

1. A pressure sensor comprising a capacitive pressure transducer having a relatively rigid, substrate having a longitudinal axis and formed of electrically insulative ceramic having an outer periphery and first and second opposed face surfaces, a relatively flexible diaphragm formed of electrically insulative ceramic having an outer periphery and having first and second opposed face surfaces, the diaphragm received on the substrate in spaced apart relation with the respective first faces facing each other and each having the same selected angular registration, a detect plate of electrically conductive material centrally disposed on the first face surface of the substrate, a source, a guard and a detect pin receiving aperture spaced from one another, each aperture extending between the first and second face surfaces of the substrate at a location intermediate to the detect plate and the outer periphery, an electrically conductive detect trace on the first face of the substrate extending from the detect plate to the detect pin receiving aperture, an electrically conductive detect guard plate on the substrate having a first generally discontinuous annulus portion having opposed ends adjacent to and spaced from the detect trace around the detect plate and spaced therefrom, the substrate guard plate having a second portion extending radially outwardly from a location adjacent the opposed ends of the substrate guard plate annulus portion to a location contiguous to the guard pin aperture and on either side of and spaced from the detect trace and surround and spaced from the detect pin aperture, a source plate of electrically conductive material centrally disposed on the first face surface of the diaphragm in alignment with the detect plate when the diaphragm is received on the substrate in the selected registration, source, guard and detect pin sites formed on the first face of the diaphragm at a location aligned with the respective source, guard and detect pin apertures when the diaphragm is received on the substrate in the selected registration, an electrically conductive source trace on the diaphragm extending from the source plate to the source pin site, an electrically conductive source guard plate on the first face of the diaphragm having a first generally discontinuous annulus portion having opposed ends adjacent to and separated from the source trace around the source plate and spaced therefrom, the source guard plate having a second portion extending radially outwardly from a location adjacent the opposed ends of the source guard plate annulus portion to a location contiguous to the guard pin site and on either side of and spaced from the source pin site, and an electrically insulative spacer to maintain the diaphragm spaced from the substrate.

2. A pressure sensor according to claim 1 in which the spacer is a glass annular ring disposed between the first generally discontinuous annular portions and a location radially adjacent to the outer periphery and having open portions aligned with the source, guard and detect pin receiving apertures.

3. A pressure sensor according to claim 2 in which the substrate and diaphragm are generally cylindrical having matching outer peripheries and the ends of the first generally discontinuous detect plate annulus portion and source plate annulus portion being a selected distance from the longitudinal axis of the generally cylindrical substrate and diaphragm and the glass annular ring being circular having an inside diameter less than the selected distance so that the glass annular ring overlaps the ends of the generally discontinuous detect plate annulus portion and source plate annulus portion.

4. A pressure sensor according to claim 1 further comprising a housing having a fluid receiving port, the pressure transducer received in the housing with the diaphragm exposed to the fluid receiving port, an electrical connector mounting terminals attached to the housing, a chamber formed between the pressure transducer and the connector and an electronic circuit disposed in the chamber and electrically connected to the pressure transducer and to the terminals.

5. A pressure sensor according to claim 2 in which the first discontinuous annulus portion of the detect guard plate and the source guard plate are formed with a trace clearance recessed outer portion in radial alignment with the guard pin aperture and guard pin site.

6. A pressure sensor comprising a capacitive pressure transducer having a relatively rigid, substrate having a longitudinal axis and formed of electrically insulative ceramic having an outer periphery and first and second opposed face surfaces, a relatively flexible diaphragm formed of electrically insulative ceramic having an outer periphery and having first and second opposed face surfaces, the diaphragm received on the substrate in spaced apart relation with the receptive first faces facing each other and each having the same selected angular registration, a detect plate of electrically conductive material centrally disposed on the first face surface of the substrate, a source, a guard and a detect pin receiving aperture spaced from one another, each aperture extending between the first and second face surfaces of the substrate at a location intermediate to the detect plate and the outer periphery, an electrically conductive detect trace on the first face of the substrate extending from the detect plate to the detect pin receiving aperture, a source plate of electrically conductive material centrally disposed on the first face surface of the diaphragm in alignment with the detect plate when the diaphragm is received on the substrate in the selected registration, source, guard and detect pin sites formed on the first face of the diaphragm at a location aligned with the respective source, guard and detect pin apertures when the diaphragm is received on the substrate in the selected registration, an electrically conductive source trace on the diaphragm extending from the source plate to the source pin site, an electrically conductive source guard plate on the first face of the diaphragm having a first generally discontinuous annulus portion having opposed ends adjacent to and separated from the source trace around the source plate and spaced therefrom, the source guard plate having a second portion extending radially outwardly from a location adjacent the opposed ends of the source plate annulus portion to a location contiguous to the guard pin site and on either side of and spaced from the source pin site, and an electrically insulative spacer to maintain the diaphragm spaced from the substrate.

* * * * *